United States Patent
Noël et al.

(10) Patent No.: US 11,442,609 B1
(45) Date of Patent: Sep. 13, 2022

(54) INTERFACE FOR SETTING SPEED AND DIRECTION OF VIDEO PLAYBACK

(71) Applicant: GoPro, Inc., San Mateo, CA (US)

(72) Inventors: Jean-Baptiste Noël, Le Vesinet (FR); Nicolas Duponchel, San Mateo, CA (US); Renaud Cousin, San Mateo, CA (US); Darren Carpenter, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 80 days.

(21) Appl. No.: 16/843,009

(22) Filed: Apr. 8, 2020

(51) Int. Cl.
| | |
|---|---|
| *G06F 3/04847* | (2022.01) |
| *G06F 3/04883* | (2022.01) |
| *H04N 21/472* | (2011.01) |
| *G06F 3/04855* | (2022.01) |
| *H04N 21/431* | (2011.01) |

(52) U.S. Cl.
CPC ...... *G06F 3/04847* (2013.01); *G06F 3/04855* (2013.01); *G06F 3/04883* (2013.01); *H04N 21/4312* (2013.01); *H04N 21/47217* (2013.01)

(58) Field of Classification Search
CPC .............. G06F 3/04847; G06F 3/04855; G06F 3/04883; H04N 21/4312; H04N 21/47217
See application file for complete search history.

(56) References Cited

U.S. PATENT DOCUMENTS

| | | | | | |
|---|---|---|---|---|---|
| 5,682,326 | A * | 10/1997 | Klingler | .............. | G11B 27/034 715/202 |
| 6,115,037 | A * | 9/2000 | Sumiyoshi | ........... | G11B 27/034 715/726 |
| 6,366,296 | B1 * | 4/2002 | Boreczky | .............. | G06F 3/0481 715/719 |
| 6,658,194 | B1 * | 12/2003 | Omori | .................. | G11B 27/034 369/47.3 |
| 7,725,828 | B1 * | 5/2010 | Johnson | ............... | G11B 27/034 715/726 |
| 8,655,885 | B1 * | 2/2014 | Scott | ....................... | G06F 16/31 707/740 |
| 11,152,030 | B1 * | 10/2021 | Fortunato | ............. | G11B 27/34 |
| 2003/0146915 | A1 * | 8/2003 | Brook | ..................... | G11B 27/11 345/473 |
| 2006/0184980 | A1 * | 8/2006 | Cole | ..................... | G11B 27/034 725/88 |
| 2007/0189708 | A1 * | 8/2007 | Lerman | ................ | G11B 27/034 386/280 |
| 2008/0253735 | A1 * | 10/2008 | Kuspa | .................. | G11B 27/034 386/343 |
| 2010/0281367 | A1 * | 11/2010 | Langmacher | ........ | G11B 27/034 715/810 |
| 2012/0210228 | A1 * | 8/2012 | Wang | .................... | G11B 27/034 715/723 |

(Continued)

*Primary Examiner* — Ariel Mercado
*Assistant Examiner* — Phoebe X Pan
(74) *Attorney, Agent, or Firm* — Esplin & Associates, PC

(57) ABSTRACT

A graphical user interface for setting speed and direction of video playback may include a timeline representation of video duration. Playback speed and playback direction from a selected point of the video may be determined based on user interaction with the graphical user interface. An extent of the video duration to which the selected playback speed and selected playback direction is applied may be determined based on movement of the timeline representation.

20 Claims, 8 Drawing Sheets

(56) References Cited

U.S. PATENT DOCUMENTS

| | | | |
|---|---|---|---|
| 2012/0210230 A1* | 8/2012 | Matsuda | G11B 27/034 |
| | | | 715/723 |
| 2013/0129308 A1* | 5/2013 | Karn | H04N 5/783 |
| | | | 386/230 |
| 2014/0169765 A1* | 6/2014 | Wang | G11B 27/34 |
| | | | 386/280 |
| 2015/0205492 A1* | 7/2015 | Nobil | G06F 16/438 |
| | | | 715/716 |
| 2016/0172000 A1* | 6/2016 | Ju | H04N 9/8042 |
| | | | 386/241 |
| 2018/0121069 A1* | 5/2018 | DiVerdi | G06F 3/04845 |

* cited by examiner

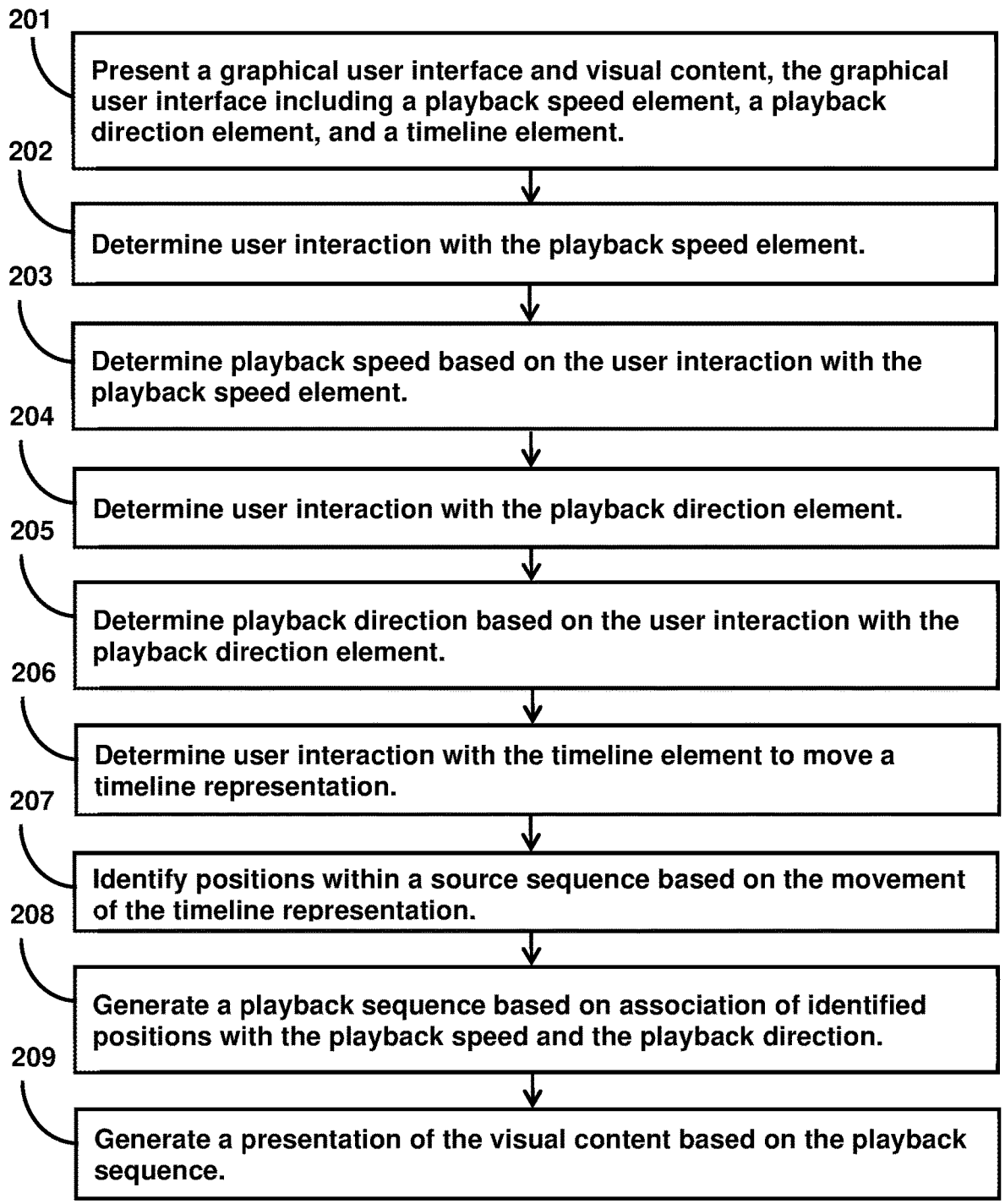

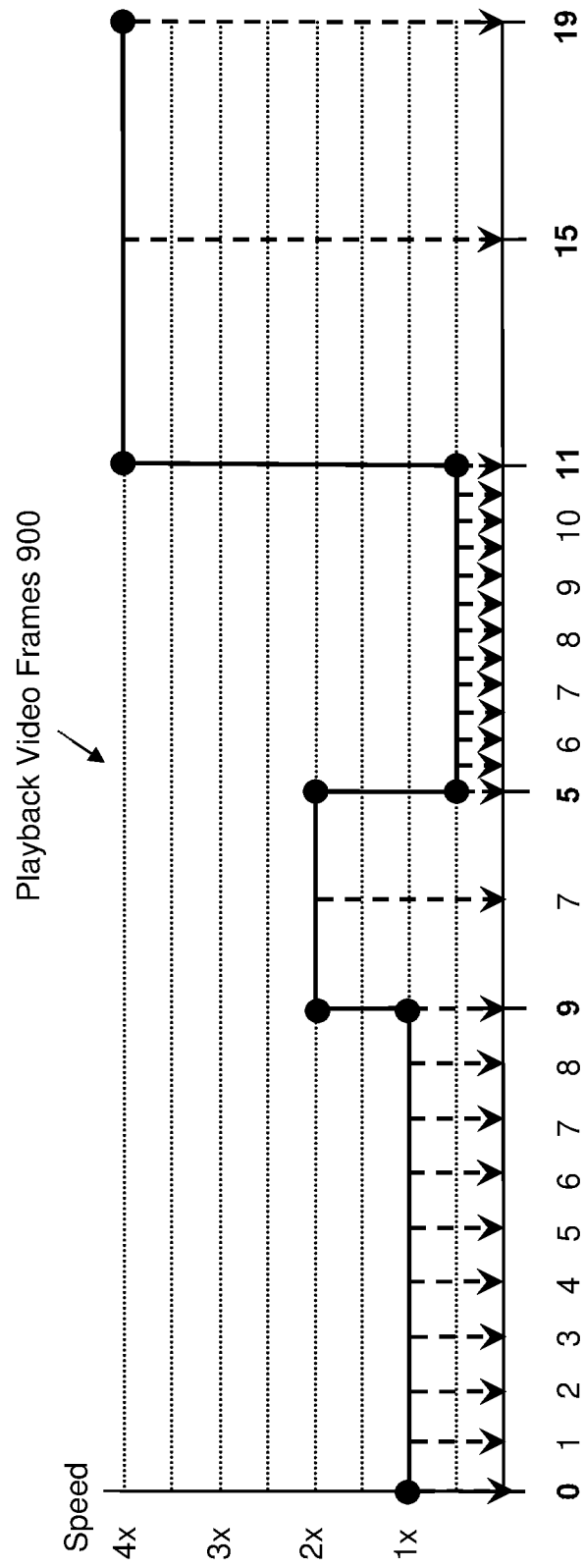

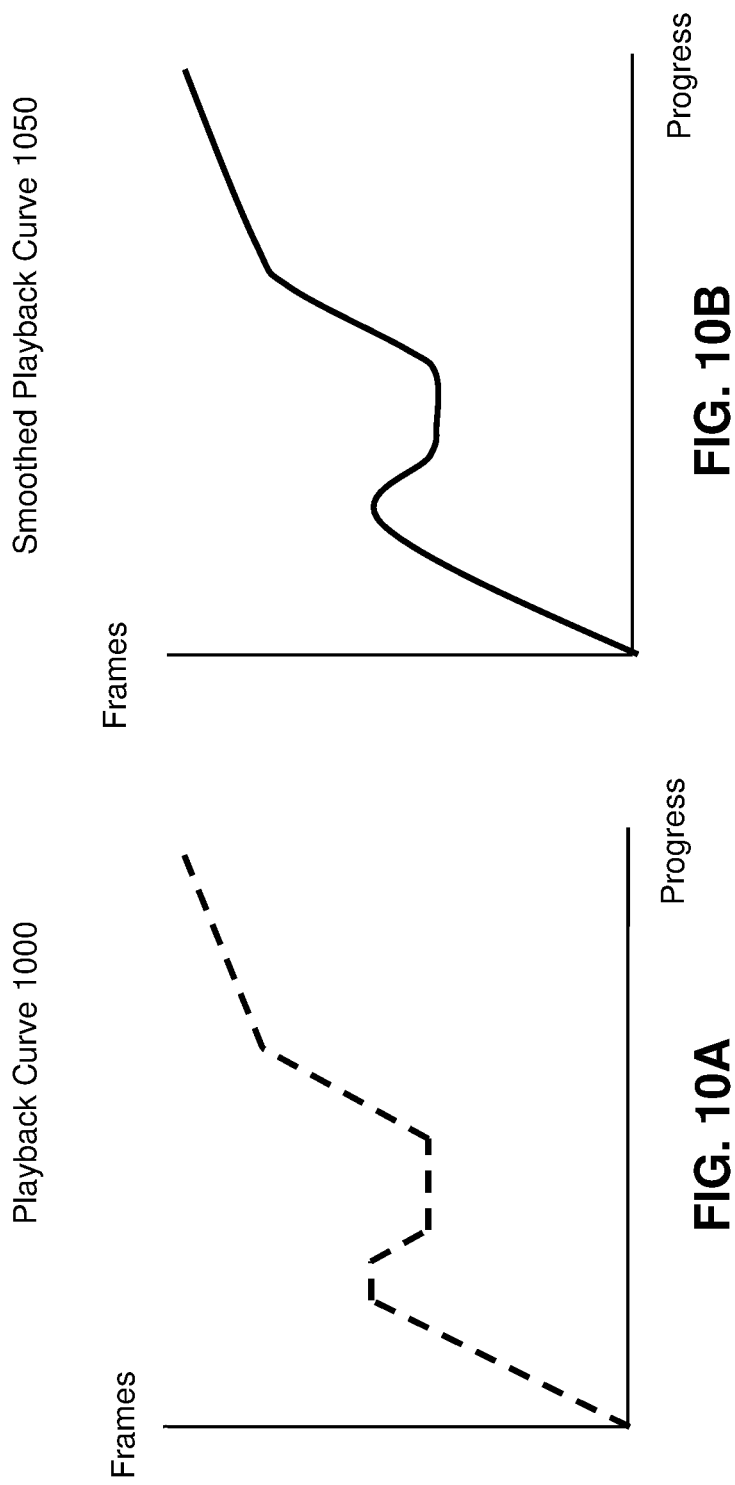

INTERFACE FOR SETTING SPEED AND DIRECTION OF VIDEO PLAYBACK

FIELD

This disclosure relates to an interface for setting speed and direction of video playback.

BACKGROUND

A user may wish to create a video edit with different playback speeds and playback direction for different segments. Selecting different playback speeds and playback directions, and designating which segments of the video will be affected by the selected playback speeds and playback directions may not be difficult, complicated, and unintuitive

SUMMARY

This disclosure relates to an interface for setting speed and direction of video playback. A touchscreen display may be configured to present visual content and receive user input via a user's engagement with the touchscreen display during the presentation of the visual content. The touchscreen display may be configured to generate output signals indicating location of the user's engagement with the touchscreen display. The visual content may have a progress length. The visual content may be defined within video frames. The video frames may be ordered in a source sequence. A graphical user interface and the visual content may be presented on the touchscreen display. The graphical user interface may include interface elements and facilitate interaction of the user with one or more of the interface elements via the user input. The interface elements may include a playback speed element, a playback direction element, a timeline element, and/or other interface elements. The playback speed element may enable user selection of playback speed from a selected position within the source sequence. The playback direction element may enable user selection of playback direction from the selected position within the source sequence. The playback direction may include forward playback direction or reverse playback direction. The timeline element may include a timeline representation of the progress length of the visual content. The timeline element may enable user selection of positions within the source sequence to be included within a playback sequence.

User interaction with the playback speed element to select the playback speed from the selected position within the source sequence may be determined. The playback speed from the selected position within the source sequence may be determined based on the user interaction with the playback speed element and/or other information. User interaction with the playback direction element to select the playback direction from the selected position within the source sequence may be determined. The playback direction from the selected position within the source sequence may be determined based on the user interaction with the playback direction element and/or other information.

User interaction with timeline element to move the timeline representation may be determined. The positions within the source sequence to be included within the playback sequence may be identified based the movement of the timeline representation and/or other information. The identified positions in the source sequence may include positions following the selected position responsive to the playback direction including the forward playback direction. The identified positions in the source sequence may include positions preceding the selected position responsive to the playback direction including the reverse playback direction. The identified positions in the source sequence may be associated with the playback speed and the playback direction.

The playback sequence may be generated based on the association of the identified positions in the source sequence with the playback speed and the playback direction, and/or other information. The playback sequence may include playback video frames corresponding to the identified positions in the source sequence. The playback video frames may be ordered in the playback sequence based on the playback direction and/or other information. The playback speed may determine perceived speed with which the playback video frames are displayed during playback. A presentation of the visual content may be generated based on the playback sequence and/or other information. The presentation of the visual content may include the playback video frames presented according to the ordering of the playback video frames in the playback sequence and with the perceived speed corresponding to the playback speed.

A system that presents an interface for setting speed and direction of video playback may include one or more electronic storage, touchscreen display, processor and/or other components. The touchscreen display may be configured to present visual content, graphical user interface, and/or other information. The touchscreen display may be configured to receive user input via a user's engagement with the touchscreen display during the presentation of the visual content. The touchscreen display may be configured to generate output signals indicating location of a user's engagement with the touchscreen display.

The electronic storage may store information relating to visual content, information relating to graphical user interface, information relating to interface elements, information relating to touchscreen display, information relating to user input, information relating to user's engagement with the touchscreen display, information relating to playback speed, information relating to playback direction, information relating to source sequence, information relating to playback sequence, and/or other information.

Visual content may have a progress length. Visual content may be defined within video frames. The video frames may be ordered in a source sequence and/or other sequences.

The processor(s) may be configured by machine-readable instructions. Executing the machine-readable instructions may cause the processor(s) to facilitate presenting an interface for setting speed and direction of video playback. The machine-readable instructions may include one or more computer program components. The computer program components may include one or more of a presentation component, a user interaction component, a playback speed component, a playback direction component, a position component, a playback sequence component, a generation component, and/or other computer program components.

The presentation component may be configured to present one or more graphical user interfaces, the visual content, and/or other information on the touchscreen display. The graphical user interface(s) may include interface elements. The graphical user interface(s) may facilitate interaction of the user with one or more of the interface elements via the user input received through the touchscreen display and/or other user input. The interface elements may include a playback speed element, a playback direction element, a timeline element, and/or other interface elements. The playback speed element may enable user selection of playback speed from a selected position within the source sequence. The playback direction element may enable user selection of playback direction from a selected position within the source sequence. The playback direction may include forward playback direction, reverse playback direction, and/or other playback direction. The timeline element may include a timeline representation of the progress length of the visual content. The timeline element may enable user selection of positions within the source sequence to be included within a playback sequence.

In some implementations, the playback speed element, the playback direction element, and/or other interface elements may be combined into a single element. The single element may include multiple options selectable by the user. Individual ones of the multiple options may define corresponding playback speed and corresponding playback direction.

In some implementations, the playback speed element may include separate options for different playback speeds. The playback direction element may include separate options for different playback directions.

The user interaction component may be configured to determine user interaction with one or more of the interface elements. The user interaction component may be configured to determine user interaction with one or more of the playback speed element, the playback direction element, the timeline element, and/or other interface elements. The user interaction component may be configured to determine user interaction with the playback speed element to select the playback speed from the selected position within the source sequence. The user interaction component may be configured to determine user interaction with the playback direction element to select the playback direction from the selected position within the source sequence. The user interaction component may be configured to determine user interaction with timeline element to move the timeline representation.

In some implementations, the movement of the timeline representation based on the user interaction with the timeline element may cause a current play position for the visual content to be changed. In some implementations, the user interaction with the timeline element to move the timeline representation may include the user dragging the timeline representation. In some implementations, the user interaction with the timeline element to move the timeline representation may include the user engaging a play element to cause playback of the visual content.

The playback speed component may be configured to determine the playback speed from the selected position within the source sequence. The playback speed from the selected position within the source sequence may be determined based on the user interaction with the playback speed element and/or other information.

The playback direction component may be configured to determine the playback direction from the selected position within the source sequence. The playback direction from the selected position within the source sequence may be determined based on the user interaction with the playback direction element and/or other information.

The position component may be configured to identify the positions within the source sequence to be included within the playback sequence. The positions within the source sequence to be included within the playback sequence may be identified based the movement of the timeline representation and/or other information. The identified positions in the source sequence may include positions following the selected position responsive to the playback direction including the forward playback direction. The identified positions in the source sequence may include positions preceding the selected position responsive to the playback direction including the reverse playback direction. The identified positions in the source sequence may be associated with the playback speed and the playback direction.

In some implementations, one or more identified position elements may be presented with the timeline representation. The identified position element(s) may visually indicate extent(s) of the identified positions in the source sequence during the movement of the timeline representation.

In some implementations, one or more selected playback speed elements may be presented with the timeline representation. The selected playback speed element(s) may visually indicate corresponding playback speed.

In some implementations, one or more selected playback direction elements may be presented with the timeline representation. The selected playback direction element(s) may visually indicate corresponding playback direction.

The playback sequence component may be configured to generate the playback sequence. The playback sequence may be generated based on the association of the identified positions in the source sequence with the playback speed and the playback direction, and/or other information. The playback sequence may include playback video frames corresponding to the identified positions in the source sequence. The playback video frames may be ordered in the playback sequence based on the playback direction and/or other information. The playback speed may determine perceived speed with which the playback video frames are displayed during playback.

In some implementations, the playback sequence may be generated as a playback curve. Direction of the playback curve may indicate corresponding playback direction. Slope of the playback curve may indicate corresponding playback speed.

The generation component may be configured to generate one or more presentations of the visual content. The presentation(s) of the visual content may be generated based on the playback sequence and/or other information. The presentation(s) of the visual content may include the playback video frames presented according to the ordering of the playback video frames in the playback sequence and with the perceived speed corresponding to the playback speed.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 2 illustrates a method for presenting an interface for setting speed and direction of video playback.

FIG. 9A illustrates example playback video frames.

FIG. 9B illustrates example playback video frames.

FIG. 10A illustrates an example playback curve.

FIG. 10B illustrates an example smoothed playback curve.

DETAILED DESCRIPTION

Figure 1:
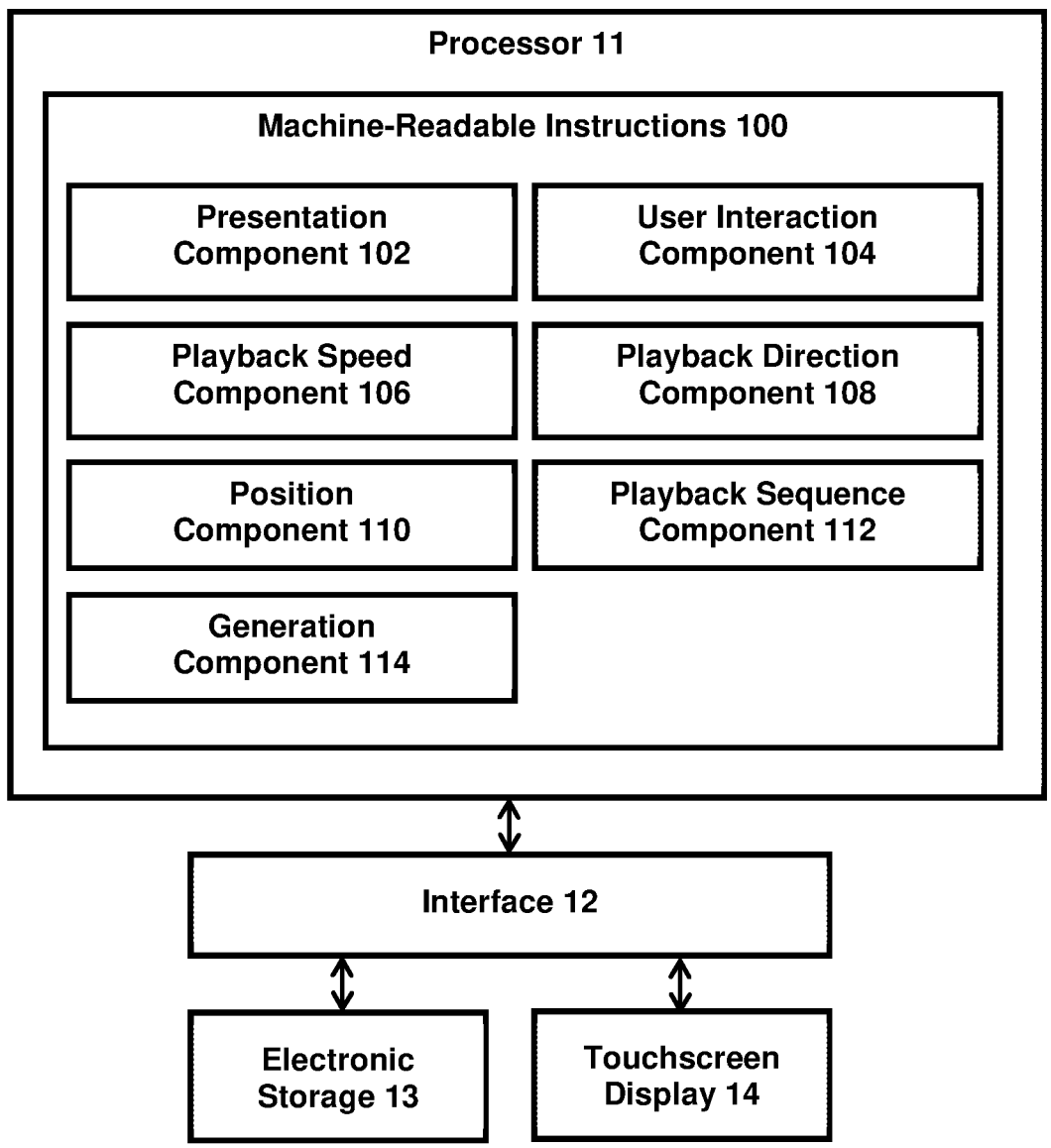
FIG. 1 illustrates a system that presents an interface for setting speed and direction of video playback.

FIG. 1 illustrates a system 10 for presenting an interface for setting speed and direction of video playback. The system 10 may include one or more of a processor 11, an interface 12 (e.g., bus, wireless interface), an electronic storage 13, a touchscreen display 14, and/or other components. The touchscreen display 14 may be configured to present visual content and receive user input via a user's engagement with the touchscreen display during the presentation of the visual content. The touchscreen display 14 may be configured to generate output signals indicating location of the user's engagement with the touchscreen display 14. The visual content may have a progress length. The visual content may be defined within video frames. The video frames may be ordered in a source sequence A graphical user interface and the visual content may be presented on the touchscreen display 14.

The graphical user interface may include interface elements and facilitate interaction of the user with one or more of the interface elements via the user input. The interface elements may include a playback speed element, a playback direction element, a timeline element, and/or other interface elements. The playback speed element may enable user selection of playback speed from a selected position within the source sequence. The playback direction element may enable user selection of playback direction from the selected position within the source sequence. The playback direction may include forward playback direction or reverse playback direction. The timeline element may include a timeline representation of the progress length of the visual content. The timeline element may enable user selection of positions within the source sequence to be included within a playback sequence.

User interaction with the playback speed element to select the playback speed from the selected position within the source sequence may be determined by the processor 11. The playback speed from the selected position within the source sequence may be determined by the processor 11 based on the user interaction with the playback speed element and/or other information. User interaction with the playback direction element to select the playback direction from the selected position within the source sequence may be determined by the processor 11. The playback direction from the selected position within the source sequence may be determined by the processor 11 based on the user interaction with the playback direction element and/or other information.

User interaction with timeline element to move the timeline representation may be determined by the processor 11. The positions within the source sequence to be included within the playback sequence may be identified by the processor 11 based the movement of the timeline representation and/or other information. The identified positions in the source sequence may include positions following the selected position responsive to the playback direction including the forward playback direction. The identified positions in the source sequence may include positions preceding the selected position responsive to the playback direction including the reverse playback direction. The identified positions in the source sequence may be associated with the playback speed and the playback direction.

The playback sequence may be generated by the processor 11 based on the association of the identified positions in the source sequence with the playback speed and the playback direction, and/or other information. The playback sequence may include playback video frames corresponding to the identified positions in the source sequence. The playback video frames may be ordered in the playback sequence based on the playback direction and/or other information. The playback speed may determine perceived speed with which the playback video frames are displayed during playback. A presentation of the visual content may be generated by the processor 11 based on the playback sequence and/or other information. The presentation of the visual content may include the playback video frames presented according to the ordering of the playback video frames in the playback sequence and with the perceived speed corresponding to the playback speed.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to visual content, information relating to graphical user interface, information relating to interface elements, information relating to touchscreen display, information relating to user input, information relating to user's engagement with the touchscreen display, information relating to playback speed, information relating to playback direction, information relating to source sequence, information relating to playback sequence, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Visual content may be defined within video frames. Visual content may have a progress length. A progress length of visual content may be defined in terms of time durations and/or frame numbers. For example, visual content of a video may have a time duration of 60 seconds. Visual content of a video may have 1800 video frames. Visual content having 1800 video frames may have a play time duration of 60 seconds when viewed at 30 frames per second. Other progress lengths are contemplated.

Video frame(s) may define/contain visual content viewable as a function of progress through the progress length of the visual content. A video frame may include an image of the video at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

Figure 5:
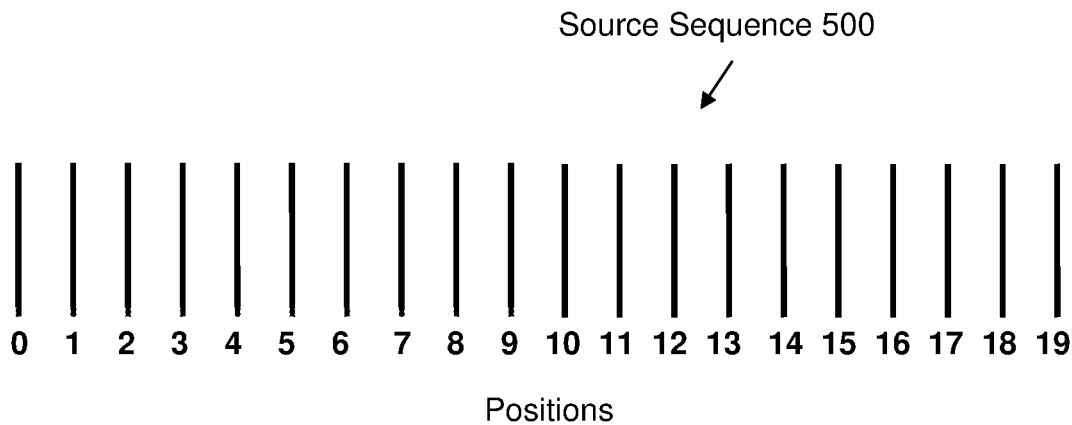
FIG. 5 illustrates an example of a source sequence.

The video frames may be ordered in a source sequence and/or other sequences. A source sequence may refer to a sequence in which the video frames are ordered in the video. A source sequence may include the video frames ordered according to an order/sequence in which the video frames/visual content of video frames were captured by an image capture device. A source sequence may include the video frames ordered according to an order/sequence in which the video frames/visual content of video frames were arranged (e.g., by a user, by an automatic video edit in a video edit). Positions within a source sequence may correspond to frames within the source sequence. Positions within a source sequence may correspond to positions between frames within the source sequence. Positions within a source sequence may correspond to points/durations within the progress length of the visual content. For example, positions within a source sequence may correspond to different time points/durations within the duration of the visual content. FIG. 5 illustrates an example of a source sequence 500. The source sequence 500 may include video frames #0-19 and/or other video frames. Individual positions within the source sequence may correspond to individual ones of the video frames #0-19.

The touchscreen display 14 may be configured to present visual content, graphical user interface, and/or other information. The touchscreen display 14 may be configured to receive user input during presentation of the visual content. The touchscreen display 14 may be configured to receive user input via a user's engagement with the touchscreen display 14 during the presentation of the visual content. The touchscreen display 14 may be configured to generate output signals indicating location of a user's engagement with the touchscreen display 14. User input (e.g., for visual content, for video application to set speed and direction of playback for the visual content) may be received/determined based on the touchscreen output signals.

For example, the touchscreen display 14 may include a touchscreen display of a mobile device (e.g., camera, smartphone, smartwatch, tablet, laptop) or a desktop device (e.g., touch monitor), and user may engage with the touchscreen display 14 to provide user input for visual content presented on the touchscreen display 14 and/or video application used to set speed and direction of playback for the visual content. In some implementations, user input may be provided through user engagement with other user interface devices, such as a keyboard, a mouse, a trackpad, and/or user interface devices. For example, visual content and graphical user interface may be presented on a non-touchscreen display, and user interaction with one or more elements of the graphical user interface may be determined and/or facilitated through the user's engagement with a mouse.

The touchscreen display 14 may include one or more touch-sensitive screens and/or other components. A user may engage with the touchscreen display 14 by touching one or more portions of a touch-sensitive screen (e.g., with one or more fingers, stylus). A user may engage with the touchscreen display 14 at a moment in time, at multiple moments in time, during a period, and/or during multiple periods. A user may tap on or move along the touchscreen display 14 to interact with visual content presented the touchscreen display 14 and/or to interact with a video application for setting speed and direction of playback for the visual content. For example, a user may tap on one or more portions of the touchscreen display 14 corresponding to one or elements of the graphical user interface presented on the touchscreen display 14 to interact (e.g., engage, toggle, manipulate) with the element(s). A user may make a moving motion (e.g., holding one or more fingers on the touchscreen display 14 and moving the finger(s) in one or more particular directions) to effectuate changes to a corresponding element of the graphical user interface presented on the touchscreen display 14.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting an interface for setting speed and direction of video playback. The machine-readable instructions 100 may include one or more computer program components. The machine-readable instructions 100 may include one or more of a presentation component 102, a user interaction component 104, a playback speed component 106, a playback direction component 108, a position component 110, a playback sequence component 112, a generation component 114, and/or other computer program components.

The presentation component 102 may be configured to present one or more graphical user interfaces, the visual content, and/or other information on the touchscreen display 14. In some implementations, one or more lower fidelity versions of the visual content may be generated for presentation on the touchscreen display 14. A lower fidelity version of the visual content may refer to a version (e.g., copy) of the visual content that is reproduced with less quality than the original visual content. For example, a lower fidelity version of the visual content may include a lower resolution version of the visual content, a lower framerate version of the visual content, and/or other lower-quality version of the visual content. In some implementations, different lower fidelity versions of the visual content may be generated for different playback directions. For example, a lower fidelity version of the visual content may be generated for forward playback, with the video frames ordered in the source sequence (e.g., from video frame #0 to video frame #19). A lower fidelity version of the visual content may be generated for reverse playback, with the video frames ordered in a reverse source sequence (e.g., from video frame #19 to video frame #0). In some implementations, a reverse-playback version of the visual content may be generated. A reverse-playback version of the visual content may have the same resolution and/or same framerate as the original visual content. A reverse playback version of the visual content may be generated for reverse playback, with the video frames ordered in a reverse source sequence (e.g., from video frame #19 to video frame #0). For example, a reverse playback version of the visual content may be used to provide preview of the visual content in reverse direction and/or to generate presentation of the visual content in reverse direction.

A graphical user interface may refer to a user interface that enables a user to interact with the system 10 through one or more interface elements. A graphical user interface may include interface elements. A graphical user interface may be static or dynamic. A graphical user interface may include a static configuration of interface elements and/or include dynamic configurations of interface elements that changes (e.g., with time, based on user interaction with one or more interface elements). Multiple ones of interface elements may be presented/included within a graphical user interface at the same time, may be presented/included within a graphical user interface at different times, and/or may be presented/included within a graphical user interface responsive to user interaction with one or more other interface elements and/or other information.

An interface element may refer to a graphical element of the user interface, such as windows, icons, buttons, graphics, and/or other visual indicators. An interface element may visually provide information and/or enable a user to provide inputs to the system 10. For example, an interface element may visually provide information determined by the system 10 and/or a user may interact (e.g., engage, toggle, manipulate) with an interface element to provide one or more input to the system 10. A graphical user interface may facilitate interaction of the user with one or more of the interface elements via the user input received through one or more user interface devices (e.g., the touchscreen display 14, a keyboard, a mouse, a trackpad) and/or other user input. For example, a graphical user interface may present/include the interface elements in a particular arrangement and enable the user to interact with individual interface elements by engaging with locations corresponding to the individual interface elements on the touchscreen display 14.

The interface elements may include one or more of a playback speed element, a playback direction element, a timeline element, and/or other interface elements. A playback speed element may refer to an interface element that enables user selection of playback speed from one or more selected positions within the source sequence. The playback speed may refer to a speed with which the visual content/video frames are to be presented during playback. The playback speed may refer to a perceived speed with which the visual content/video frames are to be presented during playback. For example, a playback speed element may refer to an interface element that enables a user to provide input to the system 10 to set the playback speed from a selected position within the source sequence. For instance, a playback speed element may be presented/included within the graphical user interface as a button and user interaction (e.g., tapping, clicking on) with the button may provide one or more commands/information to the system to set the playback speed from a selected position within the source sequence.

A playback direction element may refer to an interface element that enables user selection of playback direction from one or more selected positions within the source sequence. The playback direction may refer to direction in which the visual content/video frames are to be presented during playback. The playback speed may refer to a perceived direction in which the visual content/video frames are to be presented during playback. The playback direction may include forward playback direction, reverse playback direction, and/or other playback direction. For example, a playback direction element may refer to an interface element that enables a user to provide input to the system 10 to set the playback direction from a selected position within the source sequence. For instance, a playback direction element may be presented/included within the graphical user interface as a button and user interaction (e.g., tapping, clicking on) with the button may provide one or more commands/information to the system to set the playback direction from a selected position within the source sequence.

In some implementations, the playback speed element, the playback direction element, and/or other interface elements may be combined into a single element. For example, a single element may provide functionality of both the playback speed element and the playback direction element. The single element may include multiple options selectable by the user. Individual ones of the multiple options may define corresponding playback speed and corresponding playback direction. For example, the single element may include an option to set the playback direction to the reverse playback direction with a 2× playback speed, and another option to the set the playback direction to the forward playback direction with a 2× playback speed. Other options are contemplated.

In some implementations, the playback speed element, the playback direction element, and/or other interface elements may be separate from one another. For example, the playback speed element may include separate options for different playback speeds and the playback direction element may include separate options for different playback directions. For instance, the playback speed element may include an option to set the playback speed to 2× playback speed and another option to set the playback speed to ½× playback speed, while the playback direction element may include an option to set the playback direction to the reverse playback direction and another option to set the playback direction to the forward playback direction. The playback speed element may include separate selectable options to set the playback speed to different speeds (e.g., different buttons for different speeds). The playback speed element may include a selectable option that is manipulatable to set the playback speed to different speeds (e.g., slider, scroller). The playback direction element may include separate selectable options to set the playback direction to different directions (e.g., different buttons for different directions). The playback direction element may include a selectable option that is manipulatable to set the playback direction to different directions (e.g., toggle between forward direction and reverse direction).

A timeline element may refer to an interface element that visually represents the progress length (e.g., duration) of the visual content. A timeline element may include one or more timeline representations of the progress length of the visual content. A timeline element may refer to an interface element that enables user selection of positions within the source sequence to be included within a playback sequence. For example, a timeline element may refer to an interface element that enables a user to provide input to the system 10 based on movement of a timeline representation to select which of the positions within the source sequence is to be included within the playback sequence. The timeline element may enable selection of the positions of the source sequence to be included within the playback sequence based on movement of a timeline representation.

In some implementations, a certain amount of movement of the timeline representation may correspond to movement through the progress length of the visual content at a constant scale regardless of the progress length of the visual content. For example, the time amount of the duration of the visual content represented by a portion of the timeline representation, rather than being determined based on the duration of the visual content, may be set independent of the duration of the visual content.

For example, a traditional scrubber (video progress bar) may represent the duration of visual content of a video. The scrubber may have a certain size (e.g., length) within the graphical user interface. The size of the scrubber within the graphical user interface may represent the duration of the visual content, and a portion (e.g., segment) of the scrubber may correspond to a portion of the duration of the visual content at a non-constant scale. For example, for visual content with a duration of ten minutes, the length of the scrubber may represent ten minutes and ten percent of the length of the scrubber may correspond to one minute of the duration of the visual content. On the other hand, for visual content with a duration of one minute, the length of the scrubber may represent one minute and ten percent of the length of the scrubber may correspond to six seconds of the duration of the visual content.

The timeline representation of the duration within the timeline element, on the other hand, may represent a certain time amount regardless of the duration of the visual content. The timeline representation may have a certain size (e.g., length) within the graphical user interface. The size (e.g., length) of the timeline representation within the graphical user interface may represent a certain time amount rather than the entire duration of the visual content. A portion (e.g., segment) of the timeline representation may correspond to a fixed time duration. Setting the time amount represented by a portion of the timeline representation independent of the duration of the visual content may result in the movement of the timeline representation corresponding to visual through the duration at a constant scale regardless of the duration of the visual content.

For example, for visual content with durations of ten minutes and one minute, ten percent of the length of the scrubber may correspond to ten seconds of the duration of the visual content. Other time amount correspondence is contemplated. The time amount represented by the timeline representation may be set based on one or more defaults and/or based on user input. The movement of the timeline representation corresponding to movement through the duration of the visual content at a constant scale may make it easier for users to control the amount of positions within the source sequence to be included within the playback direction. Because the same amount of movement of the timeline representation corresponds to the same amount of the duration of the visual content regardless of the duration of the visual content, users may learn to precisely control the position selection based on repeated movement of the timeline representation.

The timeline representation may enable selection of positions within the source sequence to be included within the playback sequence based on movement of a timeline representation. That is, the user may determine which positions within the source sequence are to be associated with the selected playback speed and/or the selected playback direction by moving the timeline representation itself. For example, the user may select how many positions from a selected position within the source sequence will be included within the playback sequence with the selected playback speed and/or the selected playback direction by moving (e.g., dragging) the timeline representation in one or more direction (e.g., right, left, up, down) to "draw" out the desired positions to be associated with the selected playback speed and/or the selected playback direction. Such selection of the positions within the source sequence to be included within the playback sequence may provide intuitive and granular control over finely tuned start/stop points of for different playback speeds and/or different playback direction for the playback sequence, and may enable precise control in user selection of the positions within the source sequence to be associated with the selected playback speed and/or the selected playback direction. Such selection of the positions may provide fluid and intuitive experience in speed(s) and/or direction(s) of playback for the video.

In some implementations, the interface elements may include a position selection element. A position selection element may refer to an interface element that enables user selection of a position of the source sequence for which playback speed and/or playback direction is to be selected (e.g., via the playback speed element, the playback direction element). For example, a position selection element may refer to an interface element that enables a user to provide input to the system 10 to designate a particular position within the source sequence as the position from which playback speed and/or playback direction is to be selected. For instance, a position selection element may be presented/included within the graphical user interface as a button and user interaction (e.g., tapping, clicking on) with the button may provide one or more commands/information to the system 10 to set a position (e.g., current play position) within the source sequence as the position from which playback speed and/or playback direction is to be selected.

In some implementations, the interface elements may include a position element. A position element may refer to an interface element that visually represent current play and/or selection position for the visual content. The position element may visually indicate current point of the progress length of the visual content that is presented on the touchscreen display 14. For example, the position element may visually indicate current time position/frame number of the visual content presented on the touchscreen display 14. One side of the position element may depict positions of the source sequence included within the playback sequence and the other side of the position element may depict positions of the source sequence not included within the playback sequence.

In some implementation, the position element may be presented on top of the timeline representation to indicate the current play and/or selection position for the visual content. For example, the position element may be located at the middle of the timeline representation and/or at other locations along the timeline representation. In some implementations, the movement of the timeline representation to select the positions to be included within the playback sequence may include movement of the timeline representation along one or more sides of the position element. For example, the movement of the timeline representation may include the user dragging the timeline representation to the left or right/up or down of the position element.

The presentation component 102 may be configured to present one or more interface elements responsive to user interaction with one or more other interface elements and/or other information. For example, the presentation component 102 may be configured to, responsive to user interaction with the position selection element, present the playback speed element and/or the playback direction element, enabling the user to select the playback speed and/or the playback direction for/from the selected position.

The presentation component 102 may be configured to, responsive to user interaction with the timeline element/ timeline representation, present one or more identified position elements. An identified position element may be presented with the timeline representation. For example, the identified position element may be presented at the middle of the timeline representation and/or at other locations along the timeline representation. An identified position element may visually indicate an extent of the positions in the source sequence selected/identified for inclusion within the playback sequence (e.g., based the movement of the timeline representation). An identified position element may be presented during the movement of the timeline representation. For example, as the timeline representation is dragged to increase the number of positions selected/identified for inclusion in the playback sequence, the identified position element may get longer to trace, along the timeline representation, the positions selected/identified for inclusion in the playback sequence.

In some implementations, the presentation component 102 may be configured to present one or more selected playback speed elements. A selected playback speed element may be presented with the timeline representation. For example, the selected playback speed element may be presented within the timeline representation and/or at other locations along the timeline representation. A selected playback speed element may visually indicate playback speed for corresponding positions within the source sequence. For example, a user may have selected 2× as the playback speed and may have moved the timeline representation to apply the 2× playback speed to positions within the source sequence corresponding to 10 seconds. The selected playback speed element may be presented at a location associated with the positions corresponding to the 10 seconds with one or more visual indicators that these positions will be played back with the 2× playback speed.

In some implementations, the presentation component 102 may be configured to present one or more selected playback direction elements. A selected playback direction element may be presented with the timeline representation. For example, the selected playback direction element may be presented within the timeline representation and/or at other locations along the timeline representation. A selected playback direction element(s) may visually indicate playback direction for corresponding positions within the source sequence. For example, a user may have selected reverse playback direction and may have moved the timeline representation to apply the reverse playback direction to positions within the source sequence corresponding to 20 seconds. The selected playback direction element may be presented at a location associated with the positions corresponding to the 20 seconds with one or more visual indicators that these positions will be played back in the reverse direction. Other interface elements are contemplated.

FIGS. 3A, 3B, 3C, and 3D illustrate example graphical user interface and interface elements for setting speed and direction of video playback. These graphical user interfaces and interface elements are provided merely as examples, and the arrangement and visual aspects of the graphical user interfaces and interface elements may vary depending on the implementation. In some implementations, the graphical user interfaces and/or interface elements may include additional features and/or alternative features.

Figure 3A:
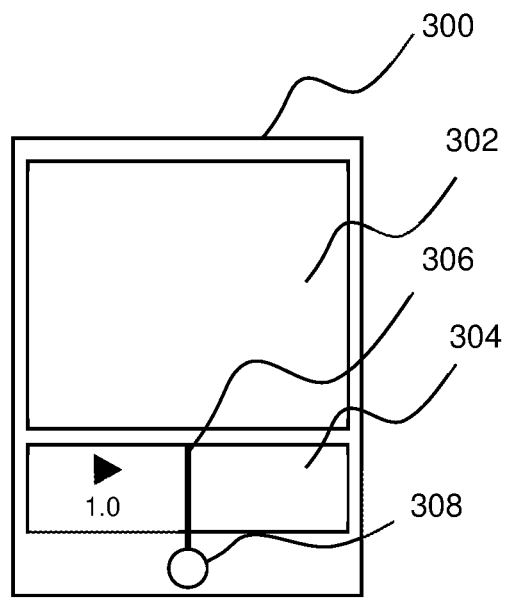
FIGS. 3A, 3B, 3C, and 3D illustrate example graphical user interface and interface elements for setting speed and direction of video playback.

FIGS. 3A, 3B, 3C, and 3D illustrate a graphical user interface 300. Referring to FIG. 3A, the graphical user interface 300 may include a visual content playback portion 302. The visual content playback portion 302 may include presentation of visual content. The graphical user interface 300 may include a timeline element 304. The timeline element 304 may include a timeline representation of the progress length (entire progress length, a portion of the progress length) of the visual content. The entirety or one or more portions of the timeline element 304 may include/be the timeline representation. The graphical user interface may include a position element 306. The position element 306 may visually represent current play and/or selection position for the visual content. In some implementation, the position element 306 may include and/or be accompanied by information providing detail on the current play and/or selection position for the visual content. For example, the position element 306 may include and/or be accompanied by information on the time position (e.g., minute:second) and/or frame position (e.g., frame number) of the visual content that is being presented within the visual content playback portion 302.

The graphical user interface 300 may include one or more interface elements to provide one or more commands to the system 10. For example, the graphical user interface 300 may include a position selection element 308 (e.g., position selection button), and a user may interact (e.g., tap, click on) the position selection element 308 to provide one or more commands/information to the system 10 to set a position (e.g., current play position indicated by the position element 306) within the source sequence as the position from which playback speed and/or playback direction is to be selected.

Figure 3B:
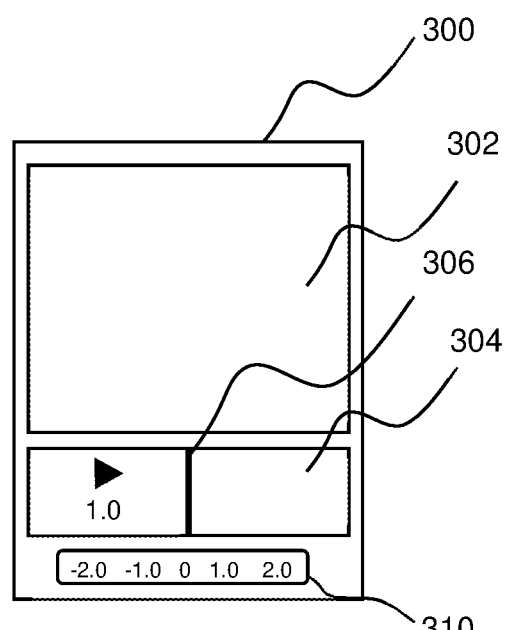

For example, responsive to user interaction with the position selection element 308, the graphical user interface 300 may be changed as shown in FIG. 3B. Responsive to user interaction with the position selection element 308, the graphical user interface 300 may be changed to present a playback speed-direction element 310. The playback speed-direction element 310 may include functionalities of both a playback speed element and a playback direction element. The playback speed-direction element 310 may include options selectable by a user to select playback speed and/or playback direction. For example, the playback speed-direction element 310 may include an option to select reverse playback direction and playback speed of 2× (−2.0), an option to select reverse playback direction and playback speed of 1× (−1.0), an option to select playback speed of 0× (0), an option to select forward playback direction and playback speed of 1× (1.0), and an option to select forward playback direction and playback speed of 2× (2.0). Other options are contemplated.

User may interact with the playback speed-direction element 310 to select the playback direction and playback speed for positions in the source sequence before, after, or at the selected position (e.g., position of the position element 306 when the user interacted with the position selection element 308). For example, user selection of the forward playback direction and playback speed of 1× (1.0), followed by movement of the timeline representation of the timeline element 304 may cause positions following the selected position to be associated with the forward playback direction and playback speed of 1×. The extent (e.g., number of frames, duration of time) to which the positions from the selected position is associated with the forward playback direction and playback speed of 1× may depend on the extent to which the user moved the timeline representation of the timeline element 304.

User selection of the reverse playback direction and playback speed of 2× (−2.0), followed by movement of the timeline representation of the timeline element 304 may cause positions preceding the selected position to be associated with the reverse playback direction and playback speed of 2×. The extent (e.g., number of frames, duration of time) to which the positions from the selected position is associated with the reverse playback direction and playback speed of 2× may depend on the extent to which the user moved the timeline representation of the timeline element 304.

User selection of the no playback direction/either playback direction and playback speed of 0× (0), followed by movement of the timeline representation of the timeline element 304 may cause the selected position to be duplicated so that the playback of the visual content appears to include a frozen shot. The extent (e.g., number of frames, duration of time) to which the selected position is duplicated may depend on the extent to which the user moved the timeline representation of the timeline element 304.

Figure 3C:
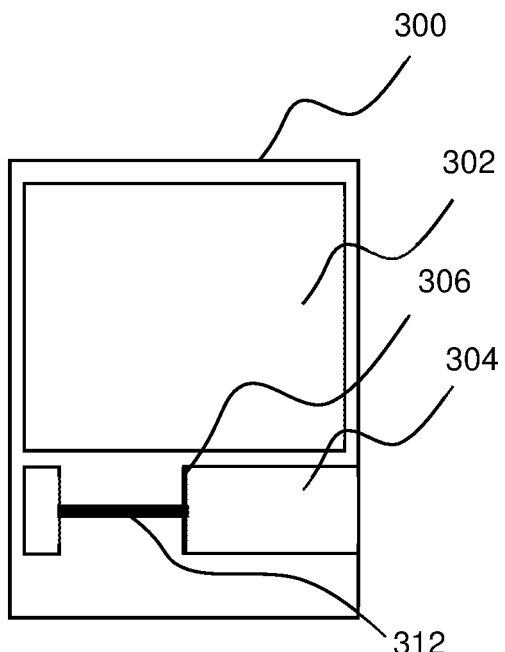

Responsive to user movement of the timeline representation of the timeline element 304, the graphical user interface 300 may be changed as shown in FIG. 3C. Responsive to user movement of the timeline representation of the timeline element 304, the graphical user interface 300 may be changed to present an identified position element 312. The identified position element 312 may visually indicate an extent of the positions in the source sequence selected/identified for inclusion within the playback sequence with the selected playback direction and/or the selected playback speed. The extent of the positions in the source sequence selected/identified for inclusion within the playback sequence with the selected playback direction and/or the selected playback speed may depend on the extent to which the user moved the timeline representation of the timeline element 304.

Figure 3D:
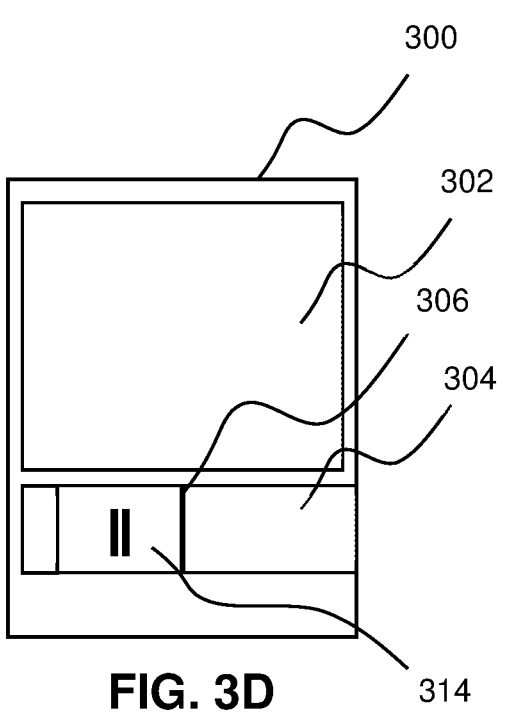

The graphical user interface 300 may include one or more interface elements to confirm the selection of playback positions, playback direction, and/or playback speed. Responsive to user confirmation of the selections, the graphical user interface 300 may be changed as shown in FIG. 3D. Responsive to user confirmation of the selections, the graphical user interface 300 may be changed to present a selected playback speed-direction element 314. The selected playback speed-direction element 314 may be presented within the timeline representation of the timeline element 304. The selected playback speed-direction element 314 may visually indicate playback direction and/or playback speed for corresponding positions within the source sequence (e.g., the positions covered by the identified position element 312 in FIG. 3C). In some implementations, a selected playback speed-direction element may be separated into a selected playback speed element that visually indicates playback speed and a selected playback direction element that visually indicates playback direction for the corresponding positions within the playback sequence. For example, selected playback direction element may include values (e.g., numbers) to visually indicate the playback speeds. The selected playback direction element may include a right facing triangle to visually represent forward playback direction and a left facing triangle to visually represent reverse playback direction. Other visual representations are contemplated.

Figure 4:
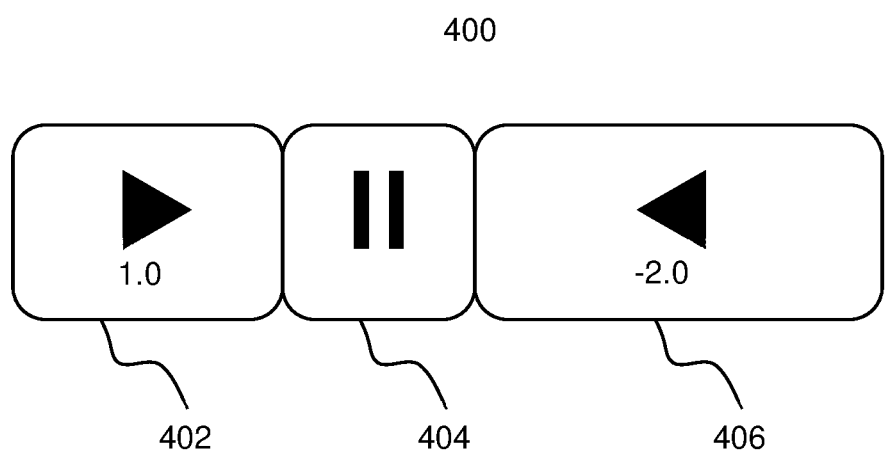
FIG. 4 illustrates an example timeline element.

FIG. 4 illustrates an example timeline element 400. In some implementations, the timeline element may be presented within one or more graphical user interfaces (e.g., the graphical user interface 300). The timeline element 400 may visually represent the selected playback speed and/or the selected playback direction for different positions within the playback sequence. For example, the timeline element 400 may include three sections 402, 404, 406. The section 402 may represent positions within the playback sequence in which video frames are ordered in a forward order, with the video frames being played back at perceived speed of 1×. The section 404 may represent a positions within the playback sequence in which visual content of a single video frame is duplicated in multiple video frames, so that the video appear to be frozen/shows a frozen shot. The section 406 may represent positions within the playback sequence in which video frames are ordered in a reverse order, with the video frames being played back at perceived speed of 2×.

The user interaction component 104 may be configured to determine user interaction with one or more of the interface elements. User interaction with interface element(s) may be determined based on user engagement with one or more user interface devices, such as the touchscreen display 14, a keyboard, a mouse, a trackpad, and/or other user interface devices. For example, based on output signals generated by the touchscreen display 14, the location of user engagement with the touchscreen display 14 may be determined, and the location of the touchscreen display 14 may correspond to one or more user interacted interface elements.

The user interaction component 104 may be configured to determine user interaction with one or more of the playback speed element, the playback direction element, the timeline element, the position selection element, and/or other interface elements. The user interaction component 104 may be configured to determine user interaction with the playback speed element to select the playback speed from the selected position within the source sequence. The user interaction component 104 may be configured to determine user interaction with the playback direction element to select the playback direction from the selected position within the source sequence. The user interaction component 104 may be configured to determine user interaction with timeline element to move the timeline representation.

For example, the user interaction component 104 may be configured to determine user interaction with the position selection element (to set a position within the source sequence as the position from which playback speed and/or playback direction is to be selected). The user interaction component 104 may be configured to determine user interaction with the playback speed element (to set the playback speed from the selected position). The user interaction component 104 may be configured to determine user interaction with the playback direction element (to set the playback direction from the selected position). The user interaction component 104 may be configured to determine user interaction with the timeline element/the timeline representation (to move the timeline element/the timeline representation).

In some implementations, the movement of the timeline representation based on the user interaction with the timeline element/the timeline representation may cause the current play position for the visual content to be changed. In some implementations, the user interaction with the timeline element to move the timeline representation may include the user dragging the timeline representation. For example, referring to FIG. 3C, the user may have dragged the timeline element 304/timeline representation to the left of the position element 306, and the extent of the positions moved to the left of the position element 306 may be represented by the identified position element 312. In some implementations, the user interaction with the timeline element to move the timeline representation may include the user engaging a play element to cause playback of the visual content. For example, the user may have interacted with a play element, and user interaction (e.g., tapping, clicking on) with the play element may provide one or more commands/information to the system 10 to cause playback of the visual content. The playback of the visual content may cause the timeline element 304/timeline representation to move to the left, and the extent of the positions moved to the left of the position element 306 may be represented by the identified position element 312.

Different moments within the progress length of the visual content may be presented based on movement of the timeline representation. Different video frames defining the visual content may be presented based on movement of the timeline representation. The moments/video frames that are presented may include preceding moments/video frames based on user selection on the reverse playback direction. In some implementations, a lower fidelity version of the visual content generated for reverse playback (with the video frames ordered in a reverse source sequence) may be used to present (e.g., provide preview of) the visual content in reverse playback direction. The moments/video frames that are presented may include subsequent moments/video frames based on user selection on the forward playback direction. In some implementations, a lower fidelity version of the visual content generated for forward playback (with the video frames ordered in the source sequence) may be used to present (e.g., provide preview of) the visual content in forward playback direction The playback speed component 106 may be configured to determine the playback speed from a selected position within the source sequence. Determining the playback speed may include determining one or more values that reflect or define the playback speed. A selected position within the source sequence may refer to position for/from which playback speed and/or playback direction is determined. A selected position within the source sequence may refer to position for/from which playback speed and/or playback direction is changed. The playback speed from the selected position within the source sequence may be determined based on the user interaction with the playback speed element and/or other information. For example, the value of the playback speed for positions at, preceding, or following the selected position within the source sequence may be determined based on the user interaction with the playback speed element and/or other information. For instance, based on the user interaction with the playback speed element to set the playback speed to a value (e.g., 2× playback speed), the value of the playback speed for positions at, preceding, or following the selected position within the source sequence may be determined to be the set value (e.g., 2× playback speed). Other determination of the playback speed are contemplated.

The playback direction component 108 may be configured to determine the playback direction from the selected position within the source sequence. Determining the playback direction may include determining in which direction (e.g., forward playback direction, reverse playback direction) the video frames will be ordered for playback. For example, the playback direction component 108 may determine whether the playback direction from the selected position within the source sequence will be in forward playback direction or reverse playback direction. The playback direction from the selected position within the source sequence may be determined based on the user interaction with the playback direction element and/or other information. For example, whether positions preceding or following the selected position within the source sequence may be arranged in forward order or reverse order may be determined based on the user interaction with the playback direction element and/or other information. For instance, based on the user interaction with the playback direction element to set the playback direction to forward playback direction, the position following the selected position within the source sequence may be arranged in forward order. Based on the user interaction with the playback direction element to set the playback direction to reverse playback direction, the position preceding the selected position within the source sequence may be arranged in reverse order. Other determination of the playback direction are contemplated.

The position component 110 may be configured to identify the positions within the source sequence to be included within the playback sequence. The positions within the source sequence to be included within the playback sequence may be identified based the movement of the timeline representation and/or other information. The positions within the source sequence to be included within the playback sequence may be identified based the movement of the timeline representation by the user (through interaction with the timeline representation) after user selection of the playback speed and/or the playback direction. The identified positions may include positions following or preceding the selected position. Whether the identified positions include positions following or preceding the selected position may depend on the playback direction selected for/from the selected position in the source sequence. The identified positions in the source sequence may include positions following the selected position responsive to the playback direction including the forward playback direction. The identified positions in the source sequence may include positions preceding the selected position responsive to the playback direction including the reverse playback direction.

The extent and/or the number of positions identified for inclusion in the playback sequence may depend on how the user interacted with the timeline representation to move the timeline representation. For example, the user may select how many positions from a selected position within the source sequence will be included within the playback sequence by moving (e.g., dragging) the timeline representation in one or more direction (e.g., right, left, up, down) to "draw" out the desired positions to be associated with the selected playback speed and/or the selected playback direction. The number of positions that are identified may increase with more movement of the timeline representation. For example, the number of positions that are identified may be proportional to the length by which the timeline representation is moved.

The extent and/or the number of positions identified for inclusion in the playback sequence may depend on the playback speed for/from the selected position in the source sequence. Faster playback speed may result in fewer number of positions being identified for inclusion in the playback sequence, while slower playback speed may result in greater number of positions being identified for inclusion in the playback sequence. For example, for selected playback speed of 1×, the identified positions may include positions corresponding to individual video frames. For selected playback speed of 2×, the identified positions may include positions corresponding to every other video frames (e.g., skipping one video frame per two video frames). For selected playback speed of 0.5×, the identified positions may include positions corresponding to individual video frames and positions between pairs of video frames (e.g., identifying/inserting new video frame between existing video frames).

The identified positions in the source sequence may be associated with the playback speed and/or the playback direction. The identified positions maybe associated with the playback speed and/or the playback direction selected by the user before movement of the timeline representation. The positions identified based on movement of the timeline representation with a selected playback speed may be associated with the selected playback speed. The positions identified based on movement of the timeline representation with forward playback direction may be associated with forward playback direction. The positions identified based on movement of the timeline representation with reverse playback direction may be associated with reverse playback direction.

Association of the identified positions in the source sequence with the playback speed and/or the playback direction may result in time-mapping of different moments (e.g., durations, points) within the progress length of the visual content with playback times. That is, different moments within the progress length of the visual content may be mapped to different moments within playback times, with the mapping being performed in accordance with the playback speed and/or the playback direction.

Figure 6:
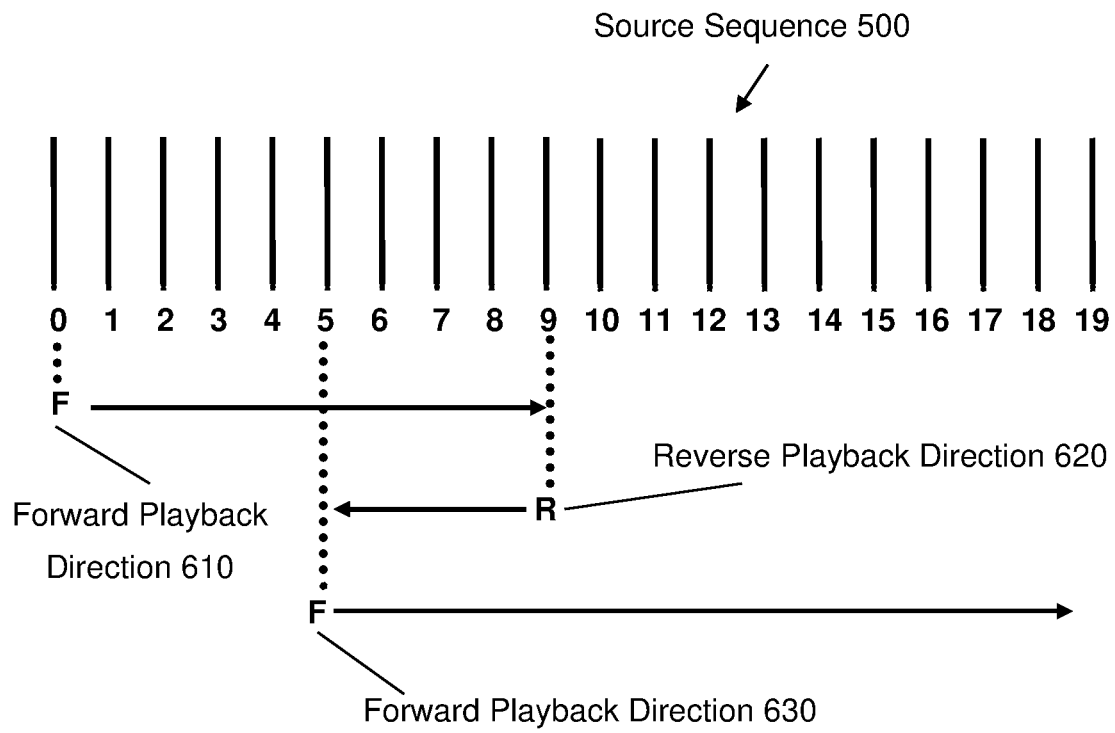
FIG. 6 illustrates an example association of positions in a source sequence 500 with playback direction.

FIG. 6 illustrates an example association of positions in a source sequence 500 with playback direction. A position in the source sequence 500 corresponding to video frame #0 may be associated with forward playback direction 610. A position in source sequence 500 corresponding to video frame #9 may be associated with reverse playback direction 620. Positions in between video frame #0 and video frame #9 may be associated with forward playback position 610. A position in source sequence 500 corresponding to video frame #5 may be associated with forward playback direction 630. Positions in between video frame #9 and video frame #5 may be associated with reverse playback position 620. Positions in the source sequence after video frame #5 may be associated with forward playback direction 630.

Figure 7:
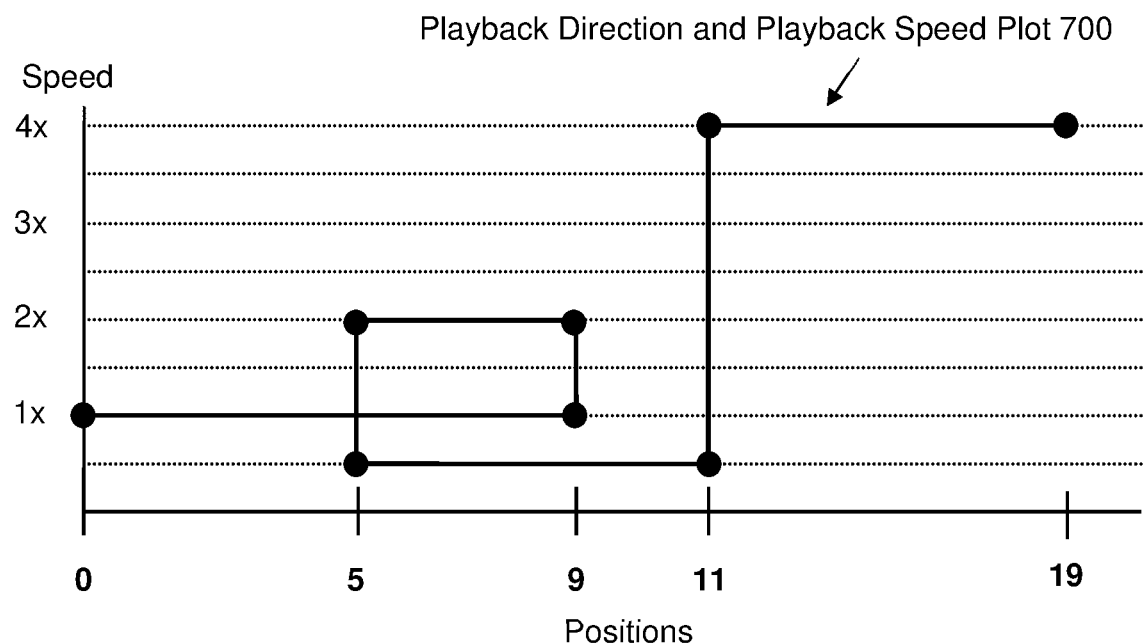
FIG. 7 illustrates an example playback direction and playback speed plot 700.

FIG. 7 illustrates an example playback direction and playback speed plot 700. The playback direction and playback speed plot 700 may show associated playback direction and playback speed for different positions within a source sequence. For example, source video frame positions #0-9 may be associated with a forward playback direction and a playback speed of 1× speed. Source video frame positions #9-5 may be associated with a reverse playback direction and a playback speed of 2× speed. Source video frame positions #5-11 may be associated with a forward playback direction and a playback speed of 0.5× speed. Source video frame positions #11-19 may be associated with a forward playback direction and a playback speed of 4× speed.

The playback sequence component 112 may be configured to generate a playback sequence. A playback sequence may refer to a sequence in which the video frames are ordered for presentation. A playback sequence may include the video frames ordered according to an order/sequence in which the video frames/visual content of video frames are to be presented during playback. A playback sequence may include the video frames ordered according to the playback speed and/or the playback direction. Positions within a playback sequence may correspond to frames within the source sequence. Positions within a playback sequence may correspond to positions between frames within the source sequence. Positions within a playback sequence may correspond to points/durations within play time of the visual content.

The playback sequence may be generated based on the association of the identified positions in the source sequence with the playback speed and/or the playback direction, and/or other information. The playback sequence may include playback video frames corresponding to the identified positions in the source sequence. Playback video frames may refer to video frames including the visual content for playback. Playback video frames may be the same as the video frames of the visual content. Playback video frames may be generated from the video frames of the visual content. For example, a playback video frame may be a copy of a video frame of the visual content. A playback video frame may be generated based on interpolation of multiple video frames of the visual content.

The playback sequence may characterize a playback order in which playback video frames in the playback sequence may be presented during playback. For example, a playback sequence in which video frames #1-3 appear in the order of video frame #1, video frame #3, video frame #2 may characterize the playback order in which the first video frame displayed during playback is video frame #1, the second video frame displayed during playback is video frame #3, and the third video frame displayed during playback is video frame #2.

Figure 8:
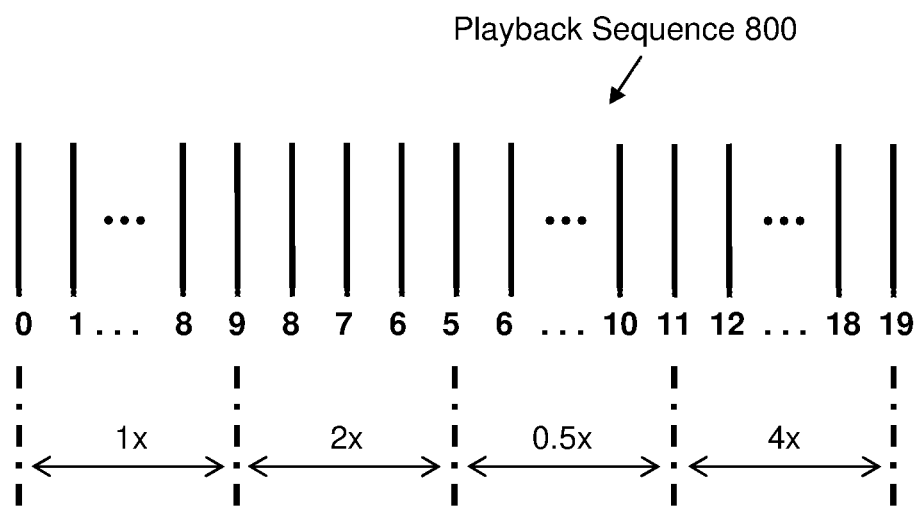
FIG. 8 illustrates an example playback sequence.

The playback video frames may be ordered in the playback sequence based on the playback direction and/or other information. Ordering the video frames in the playback sequence may include designating one or more of the video frames in the source sequence in one or more playback positions in the playback sequence. For example, FIG. 8 illustrates an example playback sequence 800. The playback sequence 800 may be generated based on the playback direction shown in FIG. 6. In playback sequence 800, video frames #0-9 may appear in numerical order (based on forward playback direction 610). Playback sequence 500 may then include video frames #8-5 in reverse numerical order (based on reverse playback direction 620). Playback sequence 500 may then include video frames #6-19 in numerical order (based on forward playback direction 630)

The playback speed may determine perceived speed with which the playback video frames are displayed during playback. The playback speed may determine how many playback video frames are included within the playback sequence. The playback speed may determine the frequency with which playback video frames are included within the playback sequence. For example, the playback sequence 800 may be generated based on the playback speed shown in FIG. 7. In FIG. 8, video frames #0-8 of playback sequence 800 may be associated with 1× speed. Video frames #9-6 may be associated with 2× speed. Video frames #5-10 may be associated with 0.5× speed. Video frames #11-18 may be associated with 4× playback speed.

FIG. 9 illustrates an example playback video frames 900. The playback video frames 900 may include playback video frames to be presented during playback based on the playback sequence 800. The playback video frames to be included within the playback may be determined based on the playback speed, the playback direction, and/or other information. The playback video frames to be included within playback of visual content may be determined based on the playback sequence, and/or other information.

Determining playback video frames to be included within playback of visual content may include identifying positions in the playback sequence based on the playback speed, the playback direction, the playback sequence, and/or other information. The identified positions may correspond to the playback video frames. Video frames corresponding to the identified positions may be selected (from video frames of the visual content) and/or generated (e.g., interpolated from multiple video frames) to be used as playback video frames. For instance, new playback video frames may be rendered to capture the ordering and perceived playback speed of the playback video frames in the playback sequence.

FIG. 9A illustrates example playback video frames 900. The playback video frames 900 may be determined and ordered based on the playback direction and the playback speed shown in the playback direction and playback speed plot 700 in FIG. 7, and/or the playback sequence 800 shown in FIG. 8. The playback video frames 900 may be shown with associated playback speeds. Speeds shown in FIG. 9 for different playback video frames 900 may correspond to the speeds shown in FIGS. 7-9. Individual ones of the playback video frames 900 may be shown as dashed arrows in FIG. 9A.

The ordering and/or number of playback video frames may be determined based on the playback speed, the playback direction, and/or the playback sequence. For example, between video frames #0-9 of playback sequence 900, one playback position may be determined for every video frame of the source sequence. The playback positions may be determined in forward direction. Playback positions determined may include playback positions #0, #1, #2, #3, #4, #5, #6, #7, #8, and #9. One playback position per video frame may be determined based on associated playback speed of 1×.

Between video frames #9-5 of playback sequence 900, one playback position may be determined for every two video frames. The playback positions may be determined in reverse direction. The ordering of the positions may be reversed based on the associated reverse playback direction. Playback positions determined may include playback positions #7 and #5. One playback position per two video frames may be determined based on associated playback speed of 2×.

Between video frames #5-11 of playback sequence 900, two playback positions may be determined for every video frame. The playback positions may be determined in forward direction. The ordering of the positions may be in forward order based on the associated forward playback direction. Playback positions determined may include playback positions #5.5, #6, #6.5, #7, #7.5, #8, #8.5, #9, #9.5, #10, #10.5, and #11. Two playback positions per video frame may be determined based on associated playback speed of 0.5×.

Between video frames #11-19 of playback sequence 900, one playback position may be determined for every four video frames. The playback positions may be determined in forward direction. The ordering of the positions may be in forward order based on the associated forward playback direction. Playback positions determined may include playback positions #15 and #19. One playback position per four video frames may be determined based on associated playback speed of 4×.

FIG. 9B illustrates example playback video frames 910. The playback video frames 910 may include video frames corresponding to the positions determined in FIG. 9A. The playback video frames 910 may include video frames corresponding to playback positions #0, #1, #2, #3, #4, #5, #6, #7, #8, and #9 (corresponding to playback speed of 1×); #7 and #5 (corresponding to playback speed of 2×); #5.5, #6, #6.5, #7, #7.5, #8, #8.5, #9, #9.5, #10, #10.5, and #11 (corresponding to playback speed of 0.5×); and #15 and #19 (corresponding to playback speed of 4×).

Playback positions and/or playback video frames may or may not correspond to positions of video frames in the source sequence. In some implementations, determining the playback video frames may include, in response to a playback position aligning with a position of a video frame in the source sequence, using the video frame in the source sequence as the playback video frame. For example, in FIG. 9A, the following playback positions of playback sequence 900 may align with video frames in the source sequence: #0, #1, #2, #3, #4, #5, #6, #7, #8, #9, #7, #5, #6, #7, #8, #9, #10, #11, #15, and #19. For these playback positions, corresponding video frames in the source sequence may be selected (e.g., used, copied) as the playback video frames (e.g., selecting video frame #9 in source sequence 500 for playback position #9, etc.).

In some implementations, determining the playback video frames may include, in response to a playback position not aligning with a position of a video frame in the source sequence, using multiple video frames in the source sequence to determine an interpolated video frame for the playback position. For example, for playback position #5.5, a playback video frame may be interpolated using video frame #5 and video frame #6 in source sequence 500. In some implementations, one or more images may be given more weight than other images for video frame interpolation. For example, a playback position may include playback position #5.3. A playback video frame generated for playback position #5.3 may include interpolation of video frame #5 and video frame #6 in the source sequence, where video frame #5 is given more influence over the interpolation because the playback position is closer to position #5 than position #6. This may allow the interpolated video frame for playback position #5.3 to appear closer to video frame #5 than video frame #6.

In some implementations, determining the playback video frames may include, in response to a playback position not aligning with a position of a video frame in the source sequence, using one of the video frames in the source sequence to determine a duplicated video frame for the playback position. For example, for playback position #6.5, a playback video frame may be duplicated from video frame #6 in source sequence 300. Duplication of video frames may allow one or more video frames in source sequence 500 to appear multiple times in a row and simulate a slower playback speed. In some implementations, the playback video frames may include interpolated video frames and duplicated video frames.

In some implementations, playback video frames may be modified to include motion blur. Motion blur may emphasize the perceived increase in speed of playback for the visual content. For example, in FIG. 8, one or more of the playback video frames corresponding to the sped-up portions of the visual content may be modified to include motion blur. The amount of motion blur may depend on the amount of playback speed increase, with greater playback speeds corresponding to greater amounts of motion blur simulated within the playback video frames.

In some implementations, the playback sequence may be generated as a playback curve. A playback curve may refer to a line that defines one or more aspects of playback sequence for visual content. One or more geometric characteristics of the playback curve may indicate one or more aspects of playback sequence. For example, direction of the playback curve may indicate corresponding playback direction. For instance, the value of the playback curve may indicate position/frames within the source sequence, and positive change in the value of the playback curve may indicate that the corresponding playback direction is forward playback direction, and negative change in the value of the playback curve may indicate that the corresponding playback direction is reverse playback direction. As another example, slope of the playback curve may indicate corresponding playback speed. For instance, the rate of change in the value of the playback curve may reflect the value of the playback speed, with higher rates of change in the value of the playback curve (steeper slope) corresponding to higher playback speed.

FIG. 10A illustrates an example playback curve 1000. The playback curve 1000 may be used to present different segments of the visual content as a single video. The playback curve 1000 may define one or more aspect of playback sequence for visual content. For example, the portions of the playback curve 1000 with positive slope may correspond to that the video frames in the source sequence being presented in forward order during playback to simulate regular playback. The portions of the playback curve 1000 with negative slope may correspond to the video frames in the source sequence being presented in reverse order during playback to simulate reverse playback (e.g., rewinding of visual content). The portions of the playback curve 1000 with zero slope (horizontal portions) may correspond to the video frames in the source sequence being presented multiple times (e.g., duplicated) during playback to simulate a frozen shot.

In some implementations, a playback curve may be smoothed to generate a smoothed playback curve. The smoothed playback curve may have smoother changes in values of the curve than the playback curve. The smoothed playback curve may provide for smoother transitions between different playback speeds and/or different plabic directions for the playback sequence and/or playback of visual content. For example, FIG. 10B illustrates an example smoothed playback curve 1050. The smoothed playback curve 1050 may be generated by smoothing the playback curve 100. The smoothed playback curve 1050 may have smoother changes in values of the curve than the playback curve 1000 (e.g., no sharp changes in value, no corners). The smoothed playback curve 1050 may provide for smoother transitions between different playback speeds and/or different plabic directions for the playback sequence and/or playback of visual content than the playback curve 1000.

Different types of speed/timing effects may be created using the graphical user interface disclosed herein. For example, by interacting with different interface elements, a user may be able to create speed ramp effects (e.g., increase in perceived speed during playback), rewind & replay effects (e.g., playback in reverse direction followed by playback in forward direction), boomerang and loop effects (e.g., going back and forth over the same video frames in forward and reverse directions), and/or other effects. A user may be able to fully remap the timing of a video using the graphical user interface.

The generation component 114 may be configured to generate one or more presentations of the visual content. The presentation(s) of the visual content may be generated based on the playback sequence and/or other information. A presentation of the visual content may refer to display of the visual content, storage of the visual content in one or more forms for display at a later time, and/or other presentation of the visual content. A presentation of the visual content may be played (e.g., shown, displayed, presented) on one or more displays, such as the touchscreen display 14. A presentation of the visual content may include the playback video frames presented according to the ordering of the playback video frames in the playback sequence and with the perceived speed corresponding to the playback speed. A presentation of the visual content may include the playback video frames determined and ordered in accordance with the ordering of the playback video frames in the playback sequence. A presentation of the visual content may include the playback video frames arranged in accordance with the playback speed and/or the playback direction selected by the user through the graphical user interface.

A presentation of the visual content may be generated as encoded visual content and/or as instructions for rending the visual content. For example, the presentation of the visual content may be generated as an encoded version of a particular video clip, and the video clip may be opened in a video player for played on the display(s). The presentation of the visual content may be generated as instructions identifying portions of the visual content (e.g., temporal portions, video frames) to be included within the presentation and the ordering of the portions of the visual content. A video player may use the instructions to retrieve the portions of the video content identified in the instructions for presentation in accordance with the ordering of the portion when the presentation is to be played.

In some implementations, a lower fidelity version of the visual content generated for forward playback (with the video frames ordered in the source sequence) may be used to generate the portion(s) of the presentation with forward playback direction. In some implementations, a lower fidelity version of the visual content generated for reverse playback (with the video frames ordered in a reverse source sequence) may be used to generate the portion(s) of the presentation with reverse playback direction.

In some implementations, visual content may include one or more of spherical visual content, virtual reality content, and/or other visual content. Spherical visual content and/or virtual reality content may include visual content viewable from one or more points of view as a function of progress through the progress length of the spherical/virtual reality visual content.

Spherical visual content may refer to visual content generated through capture of multiple views from a location. Spherical visual content may be captured through the use of one or more image capture devices to capture images/videos from a location. The captured images/videos may be stitched together to form the spherical visual content. Spherical visual content may include full spherical visual content (360 degrees of capture) or partial spherical visual content (less than 360 degrees of capture). Partial spherical visual content may be referred to as panoramic visual content.

Visual content of spherical visual content may be included within one or more spherical video frames of the spherical video. The spherical video frame(s) may define the visual content of the video content. That is, spherical video content may include spherical video frame(s) that define the visual content of the spherical video content. Spherical video frame(s) may define visual content viewable from a point of view (e.g., within a sphere, center of a sphere) as a function of progress through the progress length of the spherical video content.

Virtual reality content may refer to visual content that may be consumed via virtual reality experience. Virtual reality content may associate different directions within the virtual reality content with different viewing directions, and a user may view a particular visual portion (e.g., visual content in a particular direction) within the virtual reality content by looking in a particular direction. For example, a user may use a virtual reality headset to change the user's direction of view. The user's direction of view may correspond to a particular direction of view within the virtual reality content. For example, a forward/north looking direction of view for a user may correspond to a forward/north direction of view within the virtual reality content.

Spherical visual content and/or virtual reality content may have been captured at one or more locations. For example, spherical visual content and/or virtual reality content may have been captured from a stationary position (e.g., a seat in a stadium). Spherical visual content and/or virtual reality content may have been captured from a moving position (e.g., a moving bike). Spherical visual content and/or virtual reality content may include visual content captured from a path taken by the image capture device(s) in the moving position. For example, spherical visual content and/or virtual reality content may include visual content captured by a spherical camera of a person walking around in a music festival.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

FIG. 2 illustrates method 200 for presenting an interface for setting speed and direction of video playback. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, a graphical user interface and visual content may be presented on a touchscreen display. The touchscreen display may be configured to present visual content and receive user input via a user's engagement with the touchscreen display during the presentation of the visual content. The touchscreen display may be configured to generate output signals indicating location of the user's engagement with the touchscreen display. The visual content may have a progress length. The visual content may be defined within video frames. The video frames may be ordered in a source sequence. The graphical user interface may include interface elements and facilitate interaction of the user with one or more of the interface elements via the user input. The interface elements may include a playback speed element, a playback direction element, a timeline element, and/or other interface elements. The playback speed element may enable user selection of playback speed from a selected position within the source sequence. The playback direction element may enable user selection of playback direction from the selected position within the source sequence. The playback direction may include forward playback direction or reverse playback direction. The timeline element may include a timeline representation of the progress length of the visual content. The timeline element may enable user selection of positions within the source sequence to be included within a playback sequence. In some implementation, operation 201 may be performed by a processor component the same as or similar to the presentation component 102 (Shown in FIG. 1 and described herein).

At operation 202, user interaction with the playback speed element to select the playback speed from the selected position within the source sequence may be determined. In some implementations, operation 202 may be performed by a processor component the same as or similar to the user interaction component 104 (Shown in FIG. 1 and described herein).

At operation 203, the playback speed from the selected position within the source sequence may be determined based on the user interaction with the playback speed element and/or other information. In some implementations, operation 203 may be performed by a processor component the same as or similar to the playback speed component 106 (Shown in FIG. 1 and described herein).

At operation 204, user interaction with the playback direction element to select the playback direction from the selected position within the source sequence may be determined. In some implementations, operation 204 may be performed by a processor component the same as or similar to the user interaction component 104 (Shown in FIG. 1 and described herein).

At operation 205, the playback direction from the selected position within the source sequence may be determined based on the user interaction with the playback direction element and/or other information. In some implementations, operation 205 may be performed by a processor component the same as or similar to the playback direction component 108 (Shown in FIG. 1 and described herein).

At operation 206, user interaction with timeline element to move the timeline representation may be determined. In some implementations, operation 206 may be performed by a processor component the same as or similar to the user interaction component 104 (Shown in FIG. 1 and described herein).

At operation 207, the positions within the source sequence to be included within the playback sequence may be identified based the movement of the timeline representation and/or other information. The identified positions in the source sequence may include positions following the selected position responsive to the playback direction including the forward playback direction. The identified positions in the source sequence may include positions preceding the selected position responsive to the playback direction including the reverse playback direction. The identified positions in the source sequence may be associated with the playback speed and the playback direction. In some implementations, operation 207 may be performed by a processor component the same as or similar to the position component 110 (Shown in FIG. 1 and described herein).

At operation 208, the playback sequence may be generated based on the association of the identified positions in the source sequence with the playback speed and the playback direction, and/or other information. The playback sequence may include playback video frames corresponding to the identified positions in the source sequence. The playback video frames may be ordered in the playback sequence based on the playback direction and/or other information. The playback speed may determine perceived speed with which the playback video frames are displayed during playback. In some implementations, operation 208 may be performed by a processor component the same as or similar to the playback sequence component 112 (Shown in FIG. 1 and described herein).

At operation 209, a presentation of the visual content may be generated based on the playback sequence and/or other information. The presentation of the visual content may include the playback video frames presented according to the ordering of the playback video frames in the playback sequence and with the perceived speed corresponding to the playback speed. In some implementations, operation 209 may be performed by a processor component the same as or similar to the generation component 114 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for presenting an interface for setting speed and direction of video playback, the system comprising:
    a touchscreen display configured to present visual content and receive user input via a user's engagement with the touchscreen display during the presentation of the visual content, the visual content having a progress length and defined within video frames, the video frames ordered in a source sequence, wherein the touchscreen display is configured to generate output signals indicating location of the user's engagement with the touchscreen display; and one or more physical processors configured by machine-readable instructions to:

present a graphical user interface and the visual content on the touchscreen display, the graphical user interface including interface elements and facilitating interaction of the user with one or more of the interface elements via the user input, wherein the interface elements include a position selection element, a playback speed element, a timeline element, and a position element, the timeline element including a timeline representation of the progress length of the visual content;

determine a selected position within the source sequence from which positions are to be identified for application of a playback speed based on user interaction with the position selection element, wherein the selected position is a starting position or an ending position of the positions to be identified for the application of the playback speed;

determine the playback speed to be applied to the identified positions based on user interaction with the playback speed element;

identify the positions within the source sequence to which the playback speed is to be applied based on user interaction with the timeline representation within the timeline element to move a portion of the timeline representation across the position element, the position element having a fixed position relative to the timeline element, wherein the portion of the timeline representation that is moved across the position element is visually indicated within the graphical user interface via an identified position element, the identified position element extending from the position element and changing in length as the portion of the timeline representation is moved across the position element, further wherein a current time position of the visual content that is presented on the touchscreen display changes with the movement of the timeline representation;

generate a playback sequence based on the identified positions within the source sequence and the playback speed, the playback sequence including playback video frames corresponding to the identified positions within the source sequence, the playback speed determining perceived speed with which the playback video frames are displayed during playback; and generate a presentation of the visual content based on the playback sequence, the presentation of the visual content including the playback video frames presented and with the perceived speed corresponding to the playback speed.

2. The system of claim 1, wherein the interface elements further include a playback direction element, the playback direction element enabling user selection of playback direction from the selected position within the source sequence, the playback direction including forward playback direction or reverse playback direction, the playback speed element and the playback direction element combined into a single element, the single element including multiple options selectable by the user, individual ones of the multiple options defining corresponding playback speed and corresponding playback direction.

3. The system of claim 1, wherein the interface elements further include a playback direction element, the playback direction element enabling user selection of playback direction from the selected position within the source sequence, the playback direction including forward playback direction or reverse playback direction, the playback speed element including separate options for different playback speed and the playback direction element including separate options for different playback direction.

4. The system of claim 3, wherein a selected playback direction element is presented with the timeline representation to visually indicate corresponding playback direction.

5. The system of claim 1, wherein the position element visually indicates the current time position of the visual content that is presented on the touchscreen display, and the current time position visually indicated by the position element changes with the movement of the timeline representation.

6. The system of claim 1, wherein the user interaction with the timeline representation within the timeline element to move the portion of the timeline representation across the position element includes the user dragging the timeline representation.

7. The system of claim 1, wherein the user interaction with the timeline representation within the timeline element to move the portion of the timeline representation across the position element includes the user engaging a play element to cause playback of the visual content.

8. The system of claim 1, wherein a selected playback speed element is presented with the timeline representation to visually indicate corresponding playback speed.

9. The system of claim 1, wherein the playback sequence is generated as a playback curve, slope of the playback curve indicating corresponding playback speed.

10. A method for presenting an interface for setting speed and direction of video playback, the method performed by a computing system including one or more processors, the method comprising:

presenting, by the computing system, a graphical user interface and the visual content on a touchscreen display, the touchscreen display configured to present the visual content and receive user input via a user's engagement with the touchscreen display during the presentation of the visual content, the visual content having a progress length and defined within video frames, the video frames ordered in a source sequence, wherein the touchscreen display is configured to generate output signals indicating location of the user's engagement with the touchscreen display, the graphical user interface including interface elements and facilitating interaction of the user with one or more of the interface elements via the user input, wherein the interface elements include a position selection element, a playback speed element, a timeline element, and a position element, the timeline element including a timeline representation of the progress length of the visual content;

determining, by the computing system, a selected position within the source sequence from which positions are to be identified for application of a playback speed based on user interaction with the position selection element, wherein the selected position is a starting position or an ending position of the positions to be identified for the application of the playback speed;

determining, by the computing system, the playback speed to be applied to the identified positions based on user interaction with the playback speed element;

identifying, by the computing system, the positions within the source sequence to which the playback speed is to be applied based on user interaction with the timeline representation within the timeline element to move a portion of the timeline representation across the position element, the position element having a fixed position relative to the timeline element, wherein the portion of the timeline representation that is moved across the position element is visually indicated within the graphical user interface via an identified position element, the identified position element extending from the position element and changing in length as the portion of the timeline representation is moved across the position element, further wherein a current time position of the visual content that is presented on the touchscreen display changes with the movement of the timeline representation;

generating, by the computing system, a playback sequence based on the identified positions within the source sequence and the playback speed, the playback sequence including playback video frames corresponding to the identified positions within the source sequence, the playback speed determining perceived speed with which the playback video frames are displayed during playback; and generating, by the computing system, a presentation of the visual content based on the playback sequence, the presentation of the visual content including the playback video frames presented with the perceived speed corresponding to the playback speed.

11. The method of claim 10, wherein the interface elements further include a playback direction element, the playback direction element enabling user selection of playback direction from the selected position within the source sequence, the playback direction including forward playback direction or reverse playback direction, the playback speed element and the playback direction element combined into a single element, the single element including multiple options selectable by the user, individual ones of the multiple options defining corresponding playback speed and corresponding playback direction.

12. The method of claim 10, wherein the interface elements further include a playback direction element, the playback direction element enabling user selection of playback direction from the selected position within the source sequence, the playback direction including forward playback direction or reverse playback direction, the playback speed element including separate options for different playback speed and the playback direction element including separate options for different playback direction.

13. The method of claim 12, wherein a selected playback direction element is presented with the timeline representation to visually indicate corresponding playback direction.

14. The method of claim 10, wherein the position element visually indicates the current time position of the visual content that is presented on the touchscreen display, and the current time position visually indicated by the position element changes with the movement of the timeline representation.

15. The method of claim 10, wherein the user interaction with the timeline representation within the timeline element to move the portion of the timeline representation across the position element includes the user dragging the timeline representation.

16. The method of claim 10, wherein the user interaction with the timeline representation within the timeline element to move the portion of the timeline representation across the position element includes the user engaging a play element to cause playback of the visual content.

17. The method of claim 10, wherein a selected playback speed element is presented with the timeline representation to visually indicate corresponding playback speed.

18. The method of claim 10, wherein the playback sequence is generated as a playback curve, slope of the playback curve indicating corresponding playback speed.

19. A system for presenting an interface for setting speed and direction of video playback, the system comprising:

a touchscreen display configured to present visual content and receive user input via a user's engagement with the touchscreen display during the presentation of the visual content, the visual content having a progress length and defined within video frames, the video frames ordered in a source sequence, wherein the touchscreen display is configured to generate output signals indicating location of the user's engagement with the touchscreen display; and one or more physical processors configured by machine-readable instructions to:

present a graphical user interface and the visual content on the touchscreen display, the graphical user interface including interface elements and facilitating interaction of the user with one or more of the interface elements via the user input, wherein the interface elements include a position selection element, a playback speed element, a timeline element, and a position element, the timeline element including a timeline representation of the progress length of the visual content;

determine a selected position within the source sequence from which positions are to be identified for application of a playback speed based on user interaction with the position selection element, wherein the selected position is a starting position or an ending position of the positions to be identified for the application of the playback speed;

determine the playback speed to be applied to the identified positions based on user interaction with the playback speed element;

identify the positions within the source sequence to which the playback speed is to be applied based on user interaction with the timeline representation within the timeline element to move a portion of the timeline representation across the position element via dragging the timeline representation, the position element having a fixed position relative to the timeline element, wherein the portion of the timeline representation that is moved across the position element is visually indicated within the graphical user interface via an identified position element, the identified position element extending from the position element and changing in length as the portion of the timeline representation is moved across the position element, further wherein the position element visually indicates a current time position of the visual content that is presented on the touchscreen display, the current time position of the visual content that is presented on the touchscreen display changes with the movement of the timeline representation, and the current time position visually indicated by the position element changes with the movement of the timeline representation;

generate a playback sequence based on the identified positions within the source sequence and the playback speed, the playback sequence including playback video frames corresponding to the identified positions within the source sequence, the playback speed determining perceived speed with which the playback video frames are displayed during playback; and generate a presentation of the visual content based on the playback sequence, the presentation of the visual content including the playback video frames presented with the perceived speed corresponding to the playback speed.

20. The system of claim 19, wherein the user interaction with the timeline representation within the timeline element to move the portion of the timeline representation across the position element includes the user engaging a play element to cause playback of the visual content.

\* \* \* \* \*